United States Patent
Yung

(10) Patent No.: US 6,205,538 B1
(45) Date of Patent: *Mar. 20, 2001

(54) INSTRUCTION RESULT LABELING IN A COUNTERFLOW PIPELINE PROCESSOR

(75) Inventor: Robert Yung, Fremont, CA (US)

(73) Assignee: Sun Microsystems, Inc., Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/295,126

(22) Filed: Aug. 24, 1994

(51) Int. Cl.$^7$ .................................................. G06F 13/00
(52) U.S. Cl. ......................... 712/201; 712/200; 712/206
(58) Field of Search .................................... 395/375, 700, 395/800, 377, 380, 390, 393, 392

(56) References Cited

U.S. PATENT DOCUMENTS

| | | | |
|---|---|---|---|
| 5,481,683 | * 1/1996 | Karim ................................... | 395/375 |
| 5,488,729 | * 1/1996 | Vegesna et al. ....................... | 712/1 |
| 5,524,262 | * 6/1996 | Colwell et al. ....................... | 395/800 |
| 5,553,256 | * 9/1996 | Fetterman et al. .................... | 395/375 |
| 5,625,789 | * 4/1997 | Hesson et al. ........................ | 395/393 |
| 5,634,026 | * 5/1997 | Heaslip et al. ........................ | 395/393 |
| 5,682,493 | * 10/1997 | Yung et al. .......................... | 395/393 |
| 5,758,112 | * 5/1998 | Yeager et al. ........................ | 395/393 |

FOREIGN PATENT DOCUMENTS

| | | | |
|---|---|---|---|
| 0 301 220 | 6/1988 | (EP) | ................................. G06F/9/38 |
| 0 432 774 | 12/1990 | (EP) | ................................. G06F/9/38 |
| 0 514 763 | 5/1992 | (EP) | ................................. G06F/9/38 |
| 0 600 611 | 11/1993 | (EP) | ................................. G06F/15/78 |
| 0 698 846 | 7/1995 | (EP) | ................................. G06F/9/38 |

OTHER PUBLICATIONS

Sproull et al., "Counterflow Pipeline Processor Architecture", Apr., 1994, Sun Microsystems Lab. Inc., CA, USA.*
Computer Architecture News, vol. 20, No. 2, May 1, 1992, New York, US, pp. 58–67.
IEEE Micro, vol. 11, No. 3, Jun. 1, 1991, Los Alamitos, CA, US, pp. 10–13 and 63–73.

* cited by examiner

Primary Examiner—Robert W. Beausoliel, Jr.
Assistant Examiner—Raymond N Phan
(74) Attorney, Agent, or Firm—Philip H. Albert

(57) ABSTRACT

The present invention provides an efficient streamlined pipeline for a counterflow pipeline processor with a renaming table. The counterflow pipeline includes an execution pipe having multiple instruction stages forming an instruction pipe, a plurality of result stages forming a result pipe, and a corresponding plurality of comparator/inserters. Each comparator/inserter couples an instruction stage to a corresponding result stages. The counterflow pipeline also includes a register exam stage with the renaming table. The renaming table has entries for associating each register value of an instruction with a unique renamed register number (RRN), thereby eliminating the need for arbitration and housekeeping (killing of stale register values), as instructions and their respective register values counterflow in the streamlined counterflow pipeline. An RRN counter, such as a modulo counter, is coupled to the renaming table and provides unique RRNs for assignment to new register values. In accordance with one embodiment of the invention, instructions are decoded and unique RRNs assigned to the source and destination operand registers. If there is no previous RRN assigned to a register operand, its register value is retrieved from a register file and inserted into the top of the result pipe. In addition, when an instruction execution produces a register result value in the execution pipe, the associated RRN and register value are inserted laterally into the result pipe. The register values and RRNs, in the form of result packages, are garnered by younger (later in program order) instructions counterflowing up the instruction pipe.

13 Claims, 13 Drawing Sheets

| OP CODE 331 | SR1 332 | SR1RRN 332a | Source VALUE 333 | F L A G 334 | SR2 335 | SR2RRN 335a | Source VALUE 336 | F L A G 337 | DR 338 | DRRRN 338a | Result VALUE 339 | F L A G 340 |

| RRN 452 | VALUE 453 | F L A G 454 |

| Physical Register Number (PRN) | Renamed Register Number (RRN) | Status |
|---|---|---|
| | | Invalid |
| | | Invalid |
| ... | ... | ... |
| | | Invalid |

| PRN | RRN | Status |
|---|---|---|
|  |  | Invalid |
|  |  | Invalid |
|  |  | ⋮ |
|  |  | Invalid |

FIG. 6A

| PRN | RRN | Status |
|---|---|---|
| R1 | 001 | Valid |
|  |  | Invalid |
|  |  | ⋮ |
|  |  | Invalid |

FIG. 6B

INSTRUCTION RESULT LABELING IN A COUNTERFLOW PIPELINE PROCESSOR

RELATED APPLICATIONS

U.S. patent application Ser. No. 08/140,654, entitled "Counterflow Pipeline", filed Oct. 21, 1993, U.S. patent application Ser. No. 08/140,655, entitled "Counterflow Pipeline Processor", filed Oct. 21, 1993, and U.S. patent application Ser. No. 08/208,526, entitled "Scoreboard Table for a Counterflow Pipeline Processor", filed Mar. 8, 1994, incorporated by reference herein, are assigned to Sun Microsystems, Inc., Mountain View Calif., assignee of the present application. The above identified patent applications are incorporated for the purpose of setting a stage for a discussion of the present invention and hence is not to be considered prior art nor an admission of prior art.

FIELD OF THE INVENTION

The present invention relates to computer systems, and more particularly, to a microprocessor having a counterflow pipeline and a renaming table.

BACKGROUND OF THE INVENTION

Microprocessors run user defined computer programs to accomplish specific tasks. All programs, regardless of the task, are composed of a series of instructions. State-of-the-art microprocessors execute instructions using a multi-stage pipeline. Instructions enter at one end of the pipeline, are processed through the stages, and the results of the instructions exit at the opposite end of the pipeline. Typically, a pipelined processor includes an instruction fetch stage, an instruction decode and register fetch stage, an execution stage, a memory access stage and a write-back stage. The pipeline increases the number of instructions being executed simultaneously, and thus the overall processor throughput is improved. A superscalar processor is a processor that includes several pipelines arranged to execute several instructions in a parallel fashion.

Control and data hazards are a problem with superscalar pipelined processors. Control and data hazards occur when instructions are dependent upon one another. Consider a first pipeline executing a first instruction and the first instruction specifies a destination register (X). A second instruction, to be executed by a second pipeline, is said to be dependent if it needs the contents of register (X). If the second pipeline were to use the contents of register (X), prior to the completion of the first instruction, an incorrect outcome may be obtained because the data in register (X) stored in a register file may be out-of-date, i.e., stale. Several approaches to avoid the data hazard problem are described in the above identified patent applications and which describe respectively a pipeline design for counterflow pipelined processor, a microprocessor architecture based on the same, and a scoreboard for the same.

The counterflow pipeline processor (CFPP) of the above identified applications depart from traditional pipeline designs in that information flow is bidirectional. Instructions are stored in an instruction cache. These instructions enter the counterflow pipeline in program order at a launch stage and proceed to a decoder for a determination of the instruction class, eg., branch, load, add and multiply. Next, the instructions proceed to a register exam stage where the source and destination operand registers, if any, are identified and a retrieval of necessary source operand value(s) from a register file is initiated. These source operand value(s) are retrieved in one of several ways from the register file and inserted into the top of the result pipe. Alternatively, the operand values can be transferred directly into the instructions.

Next, the instructions in the form of instruction packages enter and advance up the instruction pipe to be executed. Subsequently, register values are generated for the destination register operands of the instruction packages. These register values are inserted laterally into the respective result stages of the result pipe in the form of result packages which counterflow down the result pipe. As a younger (later in program order) instruction package meets a result package that is needed by that instruction package, that register value is copied. This copying process, which is referred to as "garnering", reduces the stall problem common with scalar pipeline processors of the prior art. Hence, instruction packages flow up an instruction pipe of the counterflow pipeline while the register values from previous instruction packages flow down the result pipe of the same counterflow pipeline.

Variations of the counterflow pipeline are possible. For example, the instruction pipe and the result pipe, which together forms an execution pipe, can be implemented to interoperate asynchronously. One drawback of such an asynchronous design is the requirement of complex arbitration and comparing logic coupled between each instruction stage and corresponding result stages to guarantee that register value(s) do not overtake any younger instruction packages requiring those result packages. The advance of instructions packages up the instruction pipe and counterflow of the result packages down the result pipe must be properly arbitrated by the complex arbitration and comparing logic for two important reasons.

First, at every stage of the execution pipe, the arbitration and comparing logic ensures that a targeted result package does not overtake any younger instruction package requiring the corresponding targeted register value for one of its source operands. This is accomplished by ensuring that each required source register operand of an instruction package in an instruction stage is checked against any result package in a preceding result stages, before the instruction package and the compared result package are allowed to pass each other in the execution pipe. Arbitration at every stage of the execution pipe is time consuming and disrupts the concurrency between instruction package flow and result package flow in the execution pipe.

Second, there is a need to prevent younger instructions from garnering stale (expired) result packages. Stale result packages are those result packages with register values that have been superceded by new register values produced by younger instruction packages. Hence, upon a subsequent write to a destination operand register, younger instruction packages have the task of "killing", i.e., invalidating any stale result packages, as the younger instruction packages advance up the instruction pipe.

The above described arbitration of the counterflow pipeline ensures that instruction packages and their respective result packages counterflow in an orderly manner. However, a typical execution pipe may be ten or more stages deep and the time penalty for arbitration can be substantial. Hence, there is a need for a more efficient counterflow pipeline architecture where the instruction and result packages can flow more concurrently, by eliminating the need for arbitration for "killing" of stale register values.

SUMMARY OF THE INVENTION

The present invention provides an efficient streamlined pipeline for a counterflow pipeline processor with a renaming table. The counterflow pipeline includes an execution pipe having multiple instruction stages forming an instruction pipe, a plurality of result stages forming a result pipe, and a corresponding plurality of comparator/inserters. Each comparator/inserter couples an instruction stage to a corresponding result stage. The counterflow pipeline also includes a register examination (exam) stage with the renaming table. The renaming table has assignment entries for associating register values of instructions with unique register identifiers, e.g., renamed register numbers (RRNs). As a result, the register values are distinguishable from each other, thereby minimizimg the need for complex arbitration and housekeeping (killing of stale register values), as younger (later in program order) instructions and their targeted register values counterflow in the streamlined counterflow pipeline. A counter, such as a modulo counter, is coupled to the renaming table and provides unique register identifiers for new assignments.

In one embodiment, an instruction advances up the counterflow pipeline until it reaches the register exam stage. For each source operand register that is not already represented by an entry in the renaming table, the RRN counter assigns a unique RRN to the operand register. Conversely, if the instruction includes a destination operand register, a new RRN is assigned to the operand register. The RRN assignments are recorded as entries in the renaming table. These RRNs are also recorded in the respective source register RRN field(s) and/or destination register RRN field of a corresponding instruction package.

Next, the instruction, in the form of the instruction package, enters the execution pipe and is processed by an instruction stage capable of executing the required operation. When the source operand register value(s) have been garnered from the result pipe by matching the respective RRN(s), the instruction package is executed. If the instruction package includes a destination operand register, the destination register value and associated RRN are inserted laterally into a result stage of the result pipe in the form of a result package. Subsequently, younger (later in program order) instruction packages are able to retrieve, i.e., garner, these targeted register value(s) solely by matching the respective unique RRNs of the targeted result packages counterflowing down the result pipe.

Note that prior to assigning a new RRN to a destination operand register, the renaming table is scanned and any existing valid entry(s) matching the same operand register is invalidated or overwritten. By maintaining an update renaming table, the need for very tight arbitration between the instruction pipe and the result pipe, required to kill stale results in the result pipe, is eliminated. Instead, instruction and result packages can now advance in the instruction and result pipes in a less inhibited manner. As a result, the throughput of the counterflow pipeline is substantially improved.

The present invention also eliminates the need for flushing the result pipe whenever a "trap" or similar event occurs in the counterflow pipeline. Result pipe flushing is unnecessary because register values of operand registers are associated with unique RRNs instead of non-unique register identifiers, and hence any stale register values remaining in the result pipe are simply ignored by younger instruction packages propagating in the execution pipe.

DESCRIPTION OF THE DRAWINGS

The objects, features and advantages of the system of the present invention will be apparent from the following description in which:

FIG. 3 shows one implementation of an instruction package for the CFPP.

FIG. 4 shows one implementation of a result package for the CFPP.

FIG. 5 illustrates the format of a renaming table for the counterflow pipeline.

FIG. 6A through 6F illustrates the contents of the renaming table corresponding to the processing of assembler instructions I1 to I3.

DESCRIPTION OF THE PREFERRED EMBODIMENT

Figure 1:
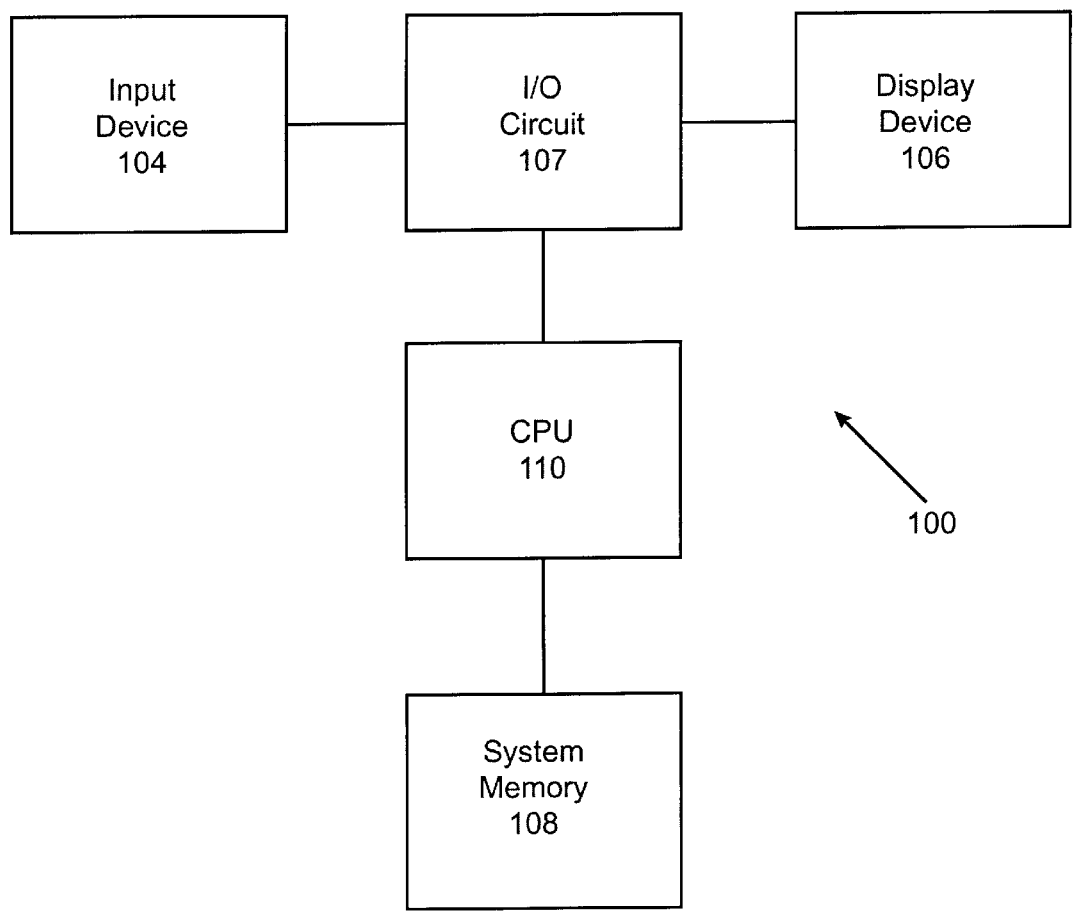
FIG. 1 is a block diagram of a computer system of the present invention.

Referring to FIG. 1, a block diagram of a computer system of the present invention is shown. The computer system 100 includes an input device 104, a display device 106, an input/output (I/O) circuit 107, a system memory 108, and a central processing unit (CPU) 110. Since the basic operation of computer system 100 is well known, a detail description is not provided herein. In one embodiment, CPU 110 is based on a scalable processor architecture (SPARC). For more information on SPARC, including the SPARC instruction set, see for example "The SPARC Architecture Manual", Version 9, SPARC International, 1993, incorporated by reference herein. It should be noted that the present invention may be based on any microprocessor architecture and may use any type of instruction set, including complex (CISC) or reduced (RISC) instructions sets.

Figure 2A:
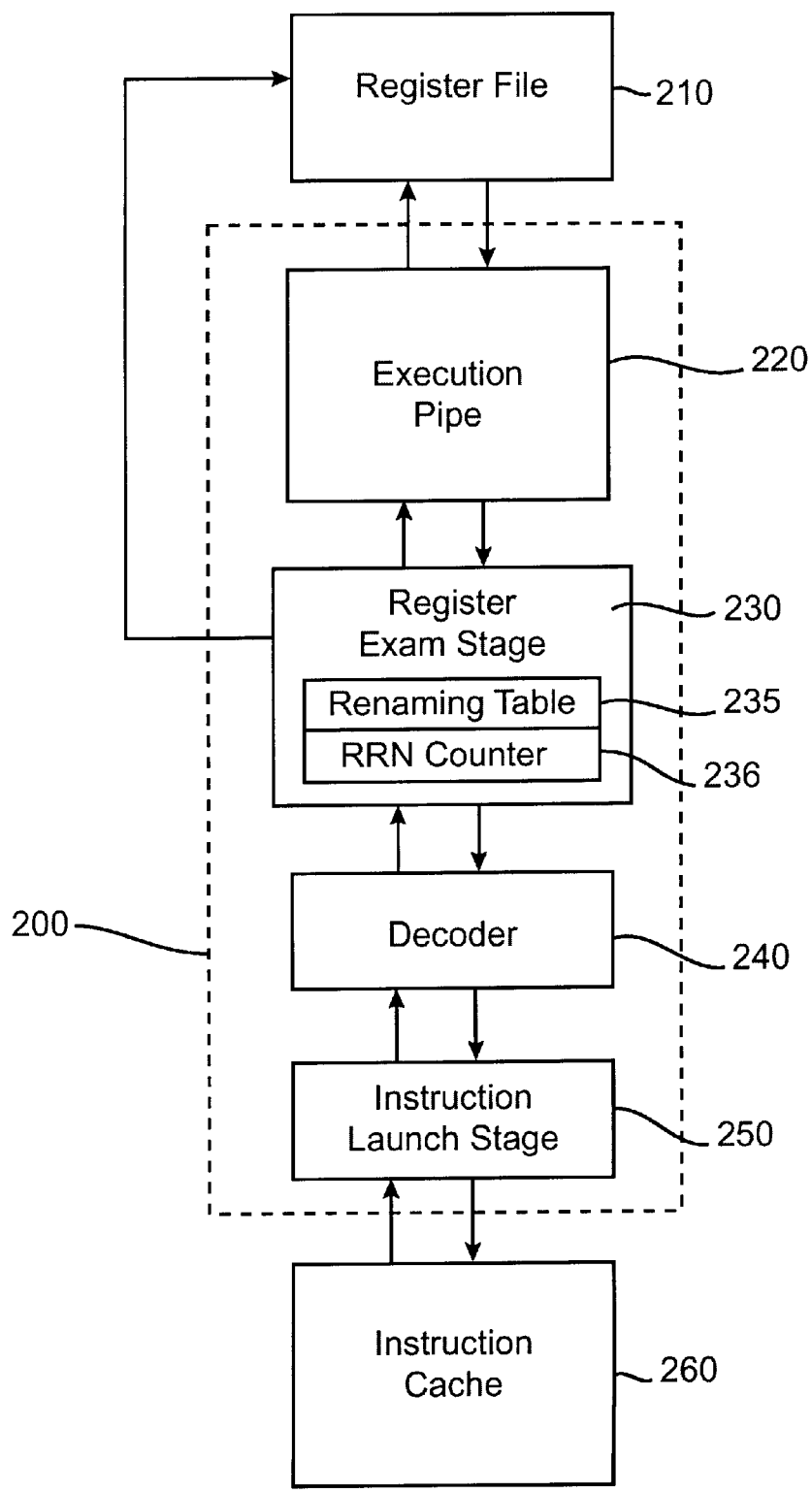
FIG. 2A is a block diagram illustrating one embodiment of a counterflow pipeline for a Counterflow Pipeline Processor (CFPP) in accordance with the invention.

In accordance with one embodiment of the present invention as shown in FIG. 2A, CPU 110 is a counterflow pipeline processor (CFPP) and is provided an enhanced pipeline 200 with a renaming table 235. Enhanced pipeline 200 includes an execution pipe 220, a register exam stage 230, a decoder 240, an instruction launch stage 250 and an instruction cache 260. Register exam stage 230 includes renaming table 235 and a counter 236. Execution pipe 220 is coupled to a register file 210. Register exam stage 230 is also coupled to register file 210.

Figure 2B:
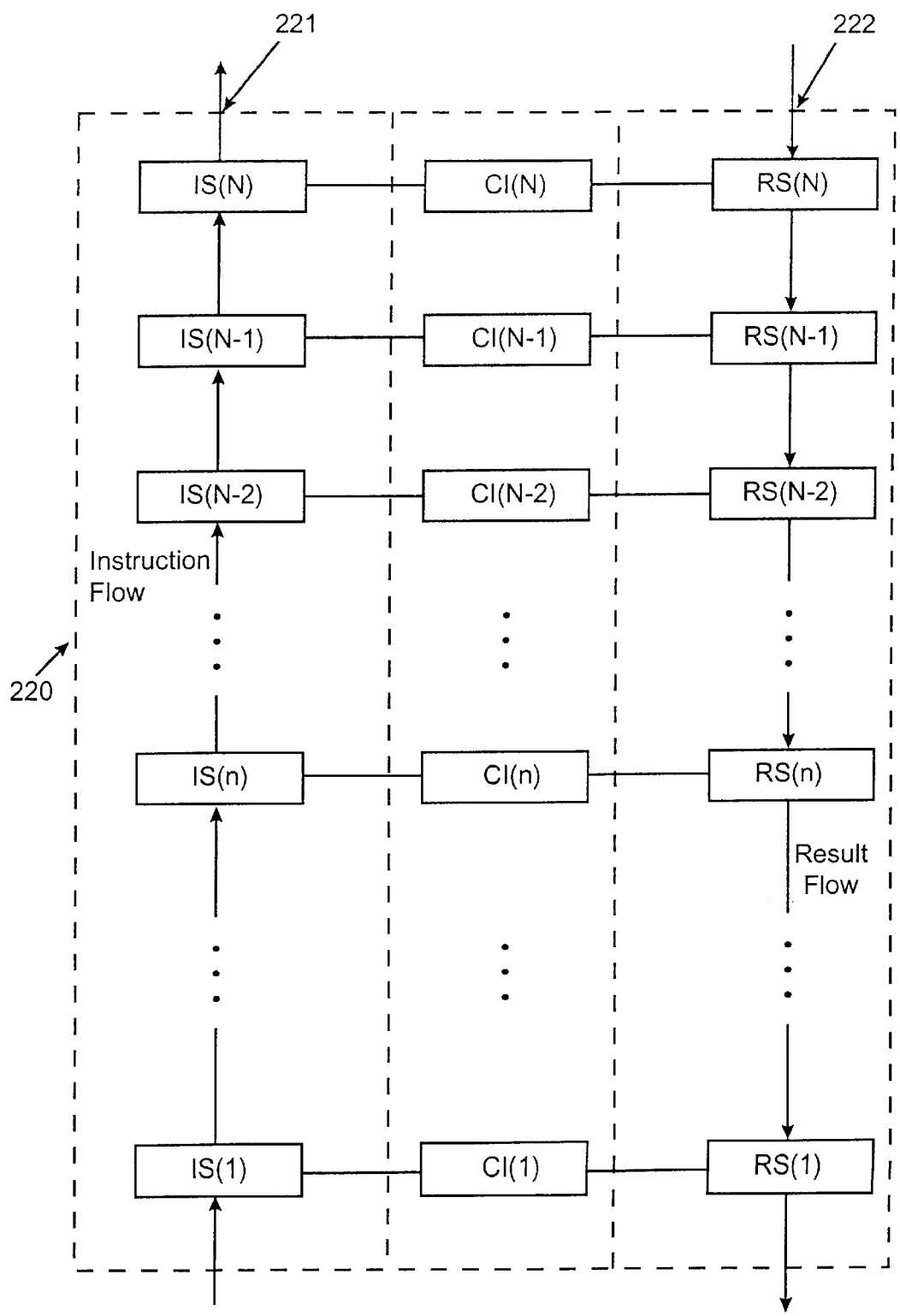
FIG. 2B is a block diagram of an execution pipe of the counterflow pipeline.

FIG. 2B is a detailed block diagram of execution pipe 220 which includes an instruction pipe 221 with a plurality of instruction stages IS(1), IS(2), IS(3), . . . IS(N), a result pipe 222 with a plurality of result stages RS(1), RS(2), RS(3) . . . RS(N), and a comparator/inserter 223 with a plurality of comparators/inserters CI(1), CI(2), CI(3), . . . CI(N). Each instruction stage is coupled to a result stage by a corresponding comparator/inserter. For example, instruction stage IS(n) is coupled to result stages RS(n) by comparator/ inserter CI(n). In addition, register exam stage 230 includes a renamed register number (RRN) counter 236 which provides unique RRNs for renaming table 235. In this embodiment, RRN counter 236 is a modulo counter and a register file 210 has N registers R1, R2 . . . RN.

Referring to FIG. 3, one implementation of an instruction package used in CPU 110 is shown. Instruction package 300 includes an Operation (OP) Code field 331, a non-unique first Source Register (SR) identifier field 332, a first source value field 333, a first flag 334, a non-unique second SR identifier field 335, a second source value field 336, a second flag 337, a non-unique Destination Register (DR) identifier field 338, a result value field 339, and a third flag 340. In addition, instruction package 300 includes three unique register identifier fields 332a, 335a and 338a.

Instruction OP code field 331 holds the instruction of instruction package 300. Fields 332 and 335 each hold a non-unique register identifier for the source operand registers, such as a physical or virtual register number. In the SPARC microprocessor environment, the physical register number (PRN) is derived by combining the virtual register number (VRN) with a register window pointer. Fields 333 and 336 hold the values for these source operand registers respectively. Flags 334 and 337 indicate if a particular instruction package 300 uses the SRs as identified in fields 332 and 335 and their validity, respectively. Field 338 holds the non-unique identifier for the DR, field 339 holds the value for that destination register, and flag 340 indicates if the instruction package 300 specifies a DR.

In accordance with this embodiment of the invention, the unique register identifier fields are RRN fields, SR1RRN 332a, SR2RRN 335a and DRRRN 338a, the RRNs of first source register SR1, second source register SR2 and destination register DR, respectively. As described in greater detail below, RRN fields 332a, 335a and 338a provide unique register identifiers for distinguishing register values from each other.

Referring to FIG. 4, a corresponding implementation of a result package used in CPU 110 is shown. Result package 400 includes a destination register identifier field 452, a value field 453 and a flag 454. Field 452 holds a unique register identifier for the DR. In this implementation, field 452 is a destination register RRN. The value field 453 holds the contents of the particular DR identified in field 452. Note that if an instruction package does not identify a DR, a result package 400 is not created for that instruction.

Figure 5:
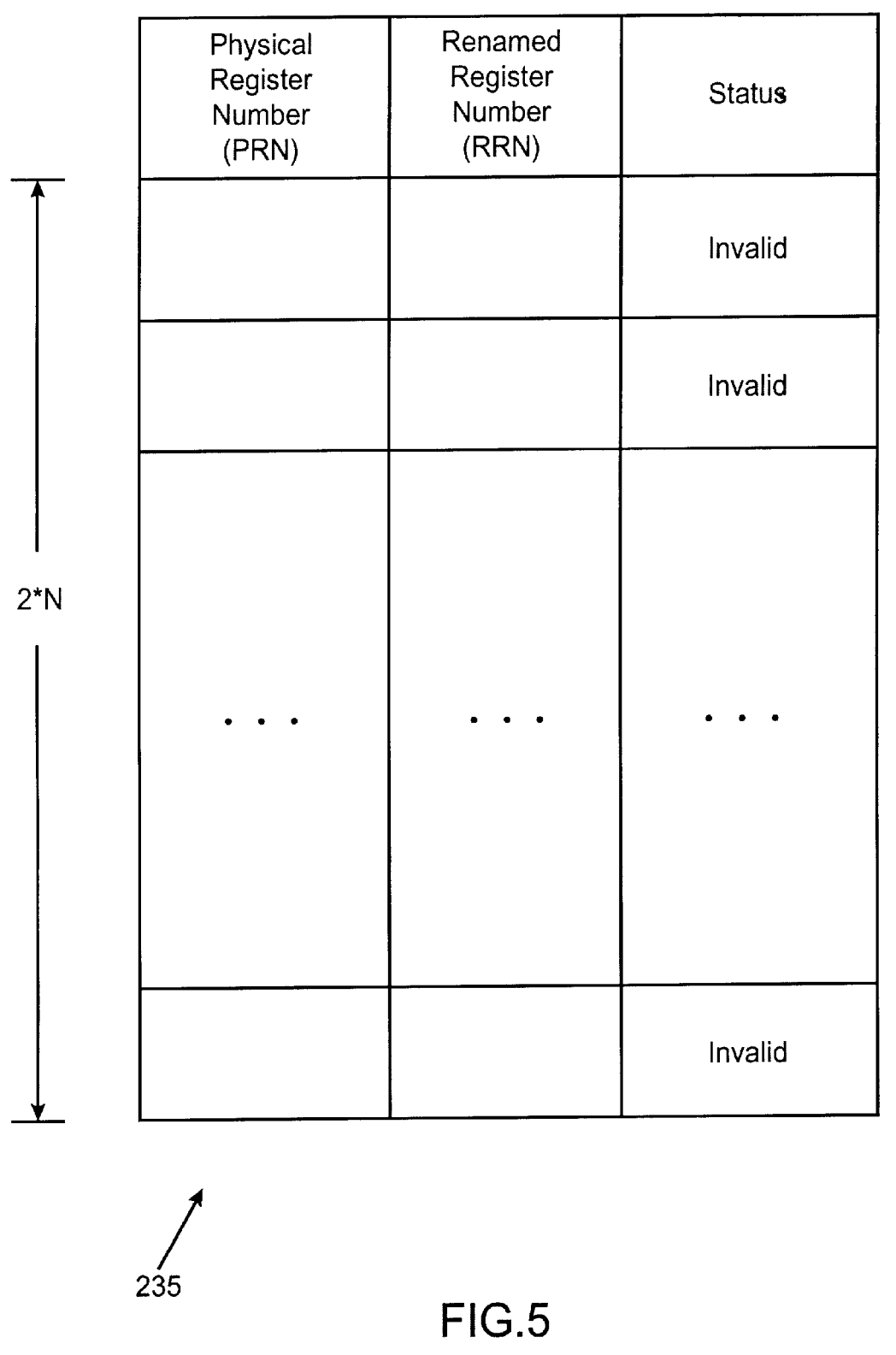

FIG. 5 shows one implementation of renaming table 235 in greater detail. Renaming table 235 has 2*N entries and each entry includes three elements, a physical register number, e.g., R1, a renamed register number (RRN) and a validity flag. As discussed above, execution pipe 200 has N stages. Hence, there can be at most N destination operand registers in instruction pipe 221 and N register result values of result packages in result pipe 222, and so the maximum number of table entries is 2*N, i.e., the maximum range of values needed for the RRNs is modulo 2*N. Operation of renaming table 235 is best described using an exemplary sequence of assembler instructions, such as the sequence of instructions I1 through I3 listed below:

I1:: ADD 2, R1, R2;; R2:=2+R1

I2:: SUB R2, 5, R2;; R2:=R2−5

I3:: MUL R2, R3, R4;; R4:=R2*R3

Figure 6C:
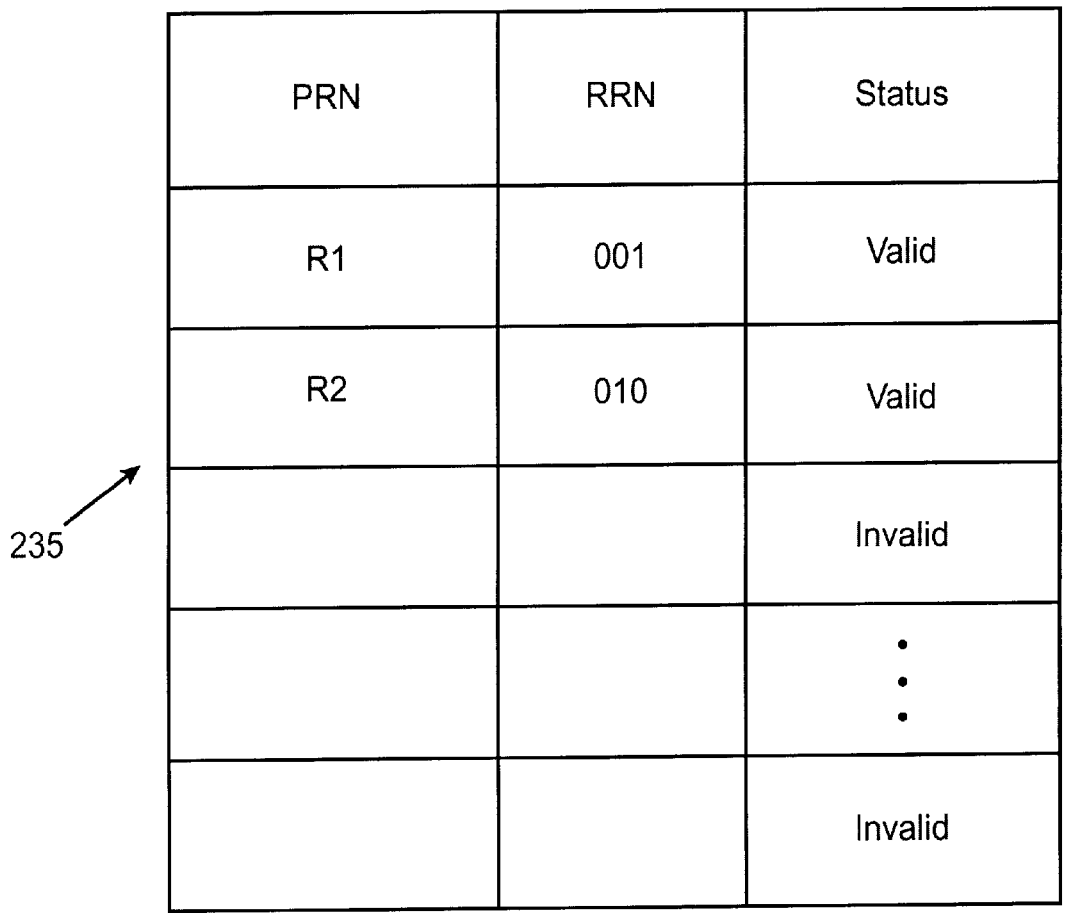

Initially, enhanced counterflow pipeline 200 is empty and the register values of registers R1, R2, R3, R4 are stored in register file 210. All the entries of renaming table 235 are invalid as shown in FIG. 6A. RRN counter 236 is reset to a suitable staring value, such as "001". FIGS. 6B through 6F illustrate the subsequent contents of renaming table 235 as instructions I1 to I3 are dispatched by instruction launch stage 250 and eventually executed in instruction pipe 221.

Figure 6D:
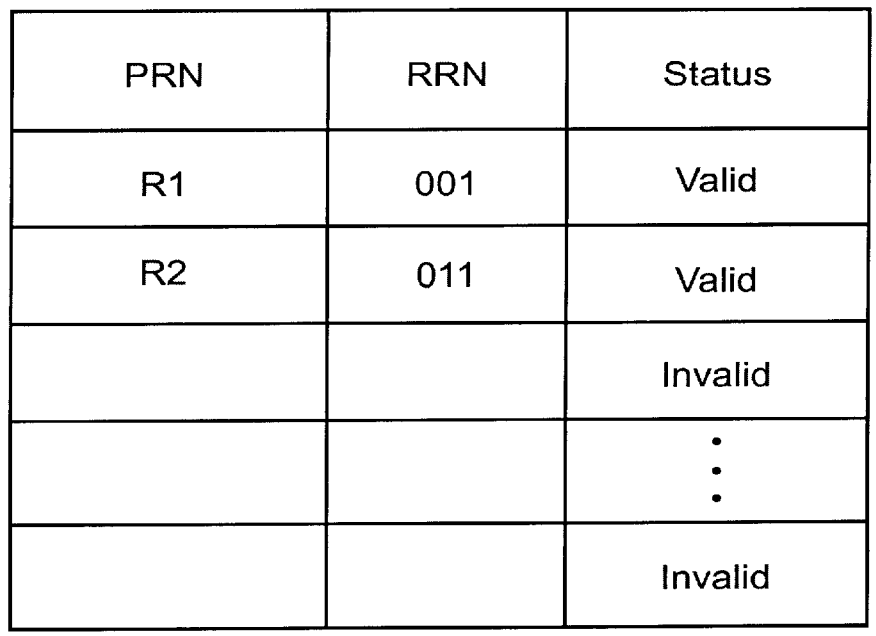
Figure 6E:
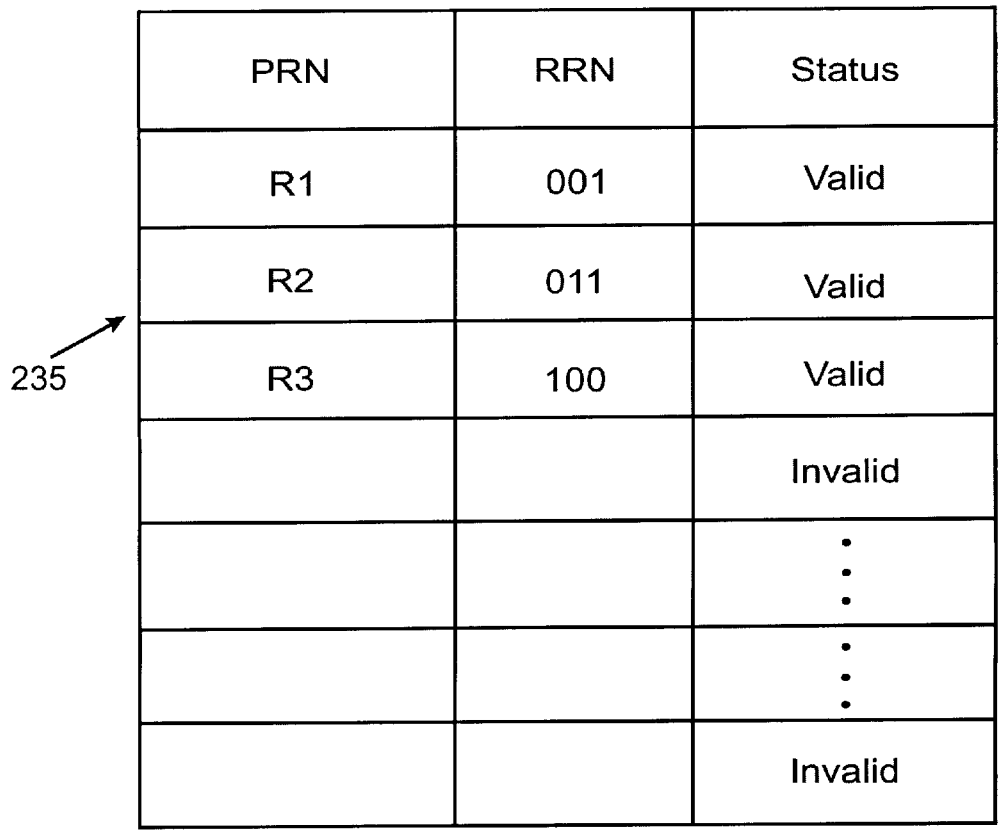

Specifically, FIG. 6A shows the state of renaming table 235 prior to the examination of instruction I1 in register exam stage 230. FIG. 6B shows the state of renaming table 235 after the examination of the source operand registers of instruction I1, FIG. 6C shows the state of renaming table 235 after instruction I1 has been examined but before the examination of instruction I2. FIG. 6D illustrates table 235 after the examination of instruction I2. FIG. 6E shows the state of renaming table 235 after the examination of the source operands of instruction I3. Finally, FIG. 6D corresponds to the state of table 235 after all three instructions I1, I2, I3 have been examined.

Figure 7A:
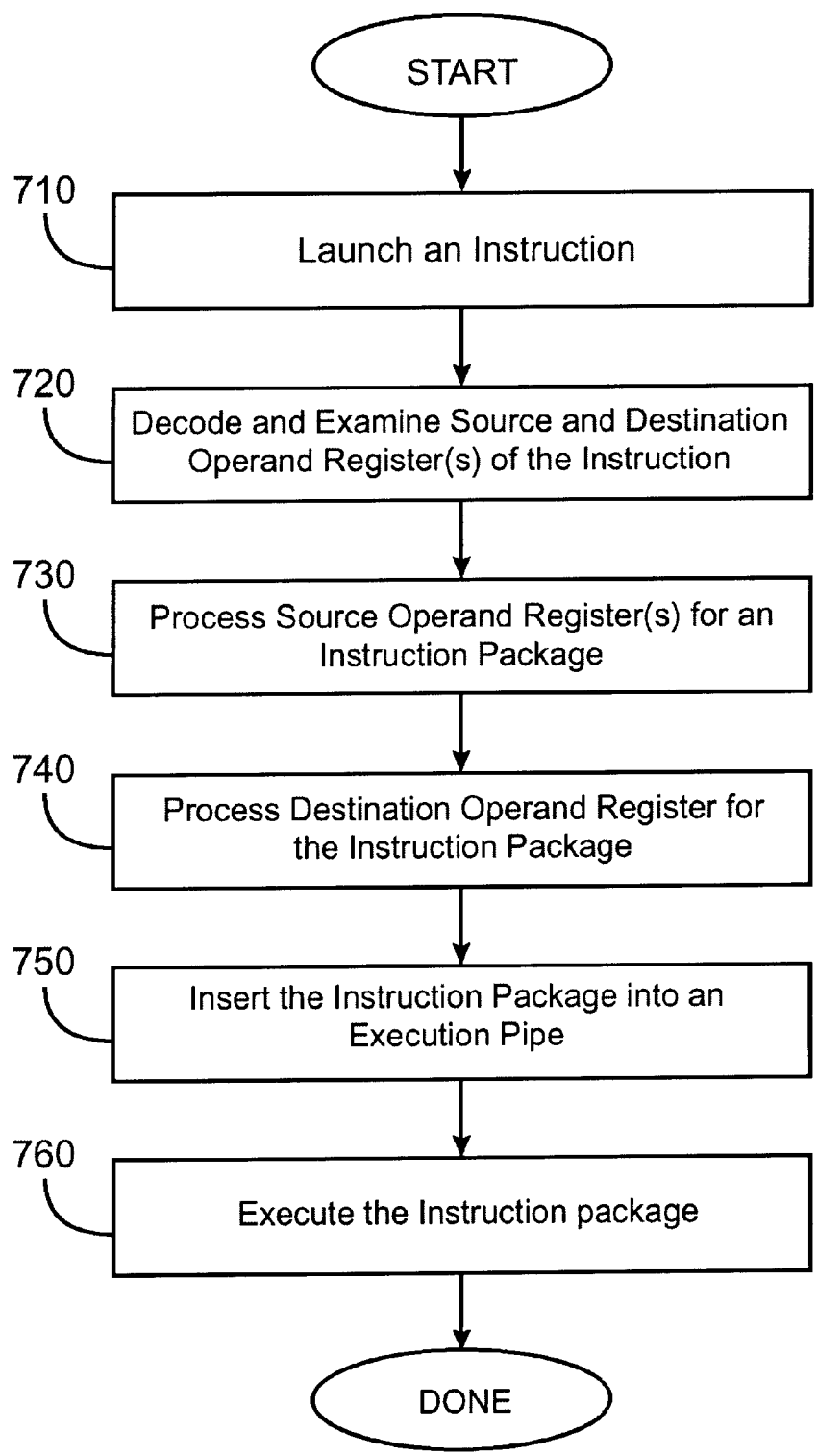
FIG. 7A is a flow chart illustrating the processing of instructions in the counterflow pipeline in accordance with the invention.
Figure 7B:
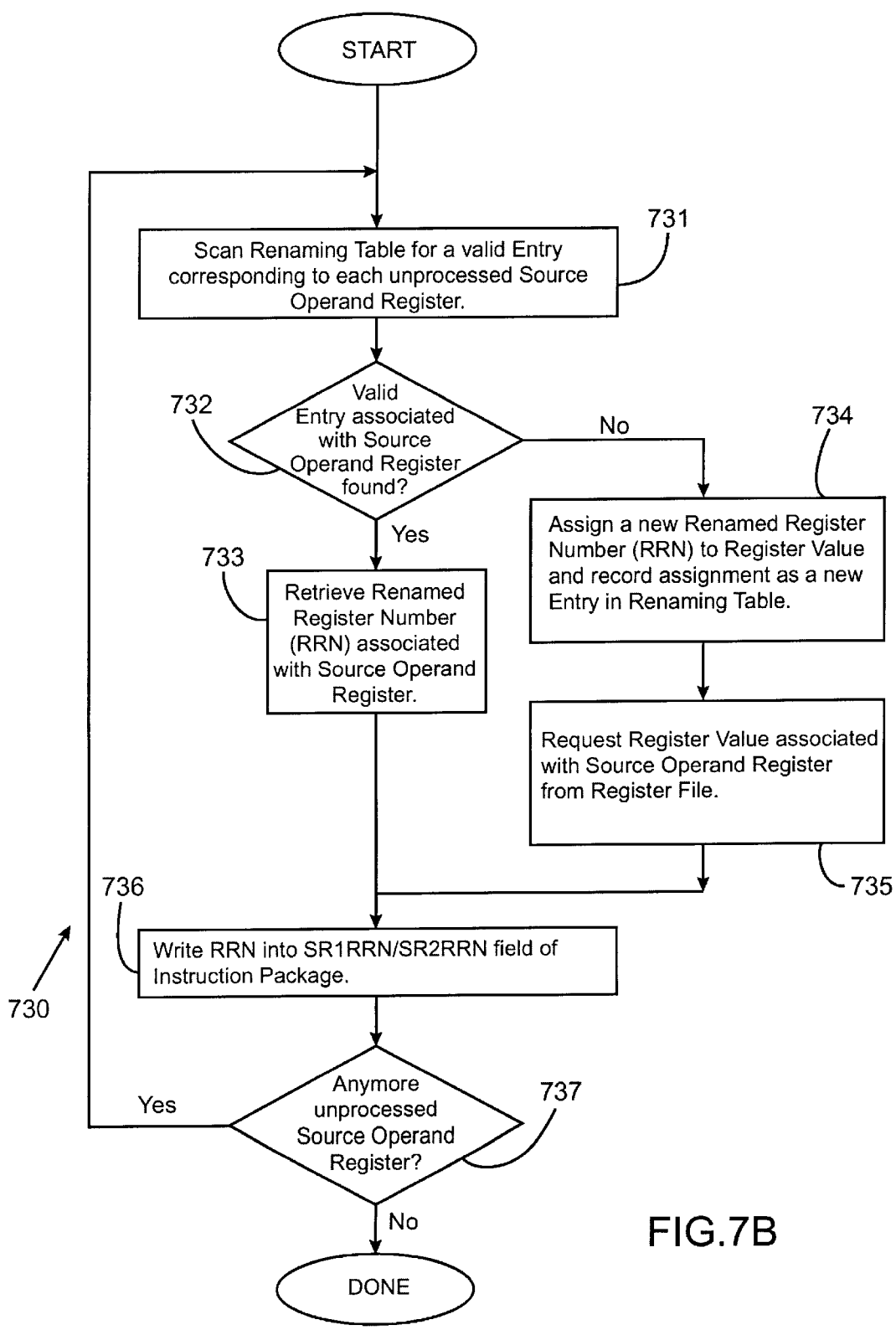
FIG. 7B is a flow chart illustrating assignments and subsequent use of renamed register numbers (RRNs) for source operand registers of the instructions.
Figure 7C:
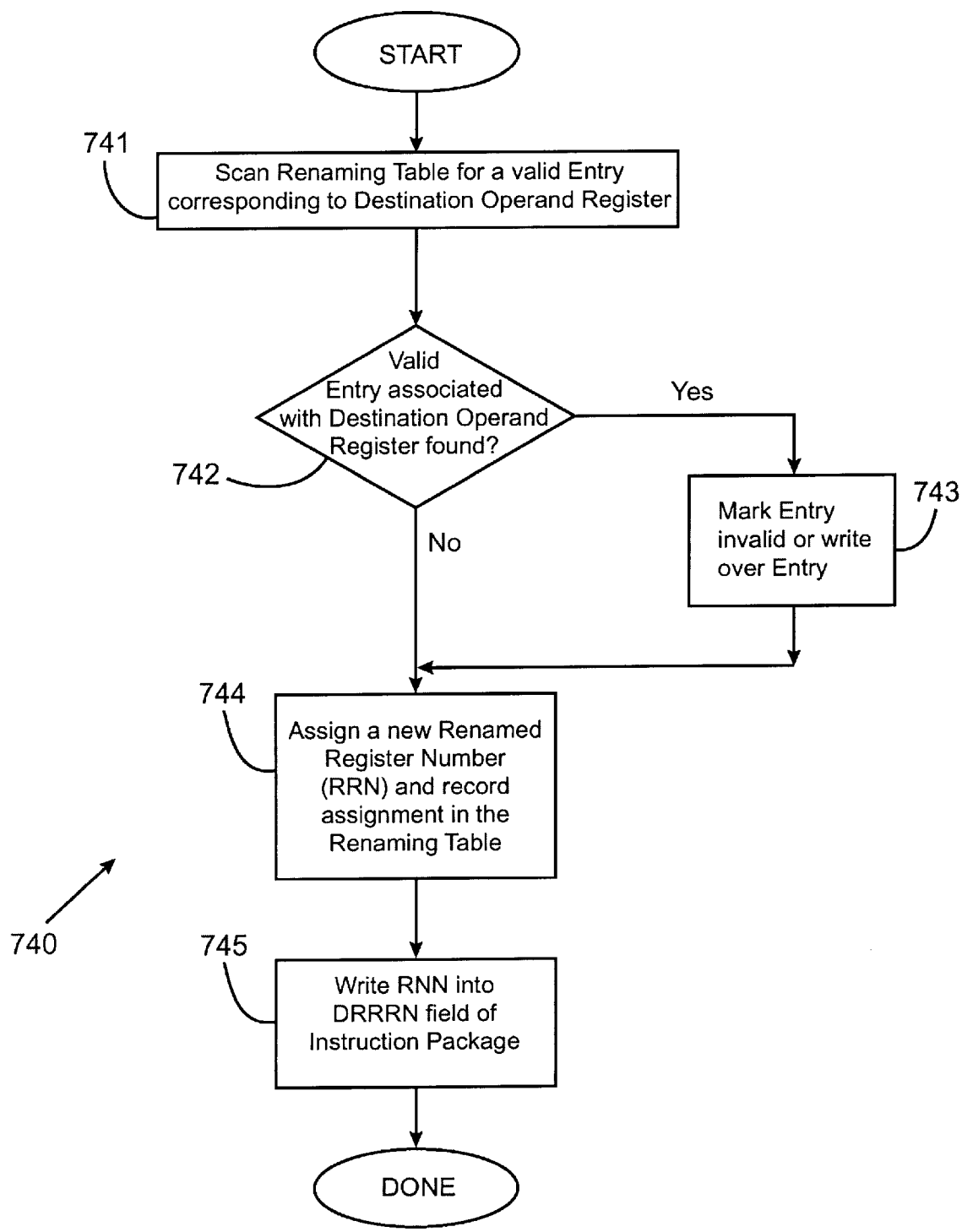
FIG. 7C is a flowchart illustrating assignments and subsequent use of RRNs for destination operand registers of the instructions.
Figure 7D:
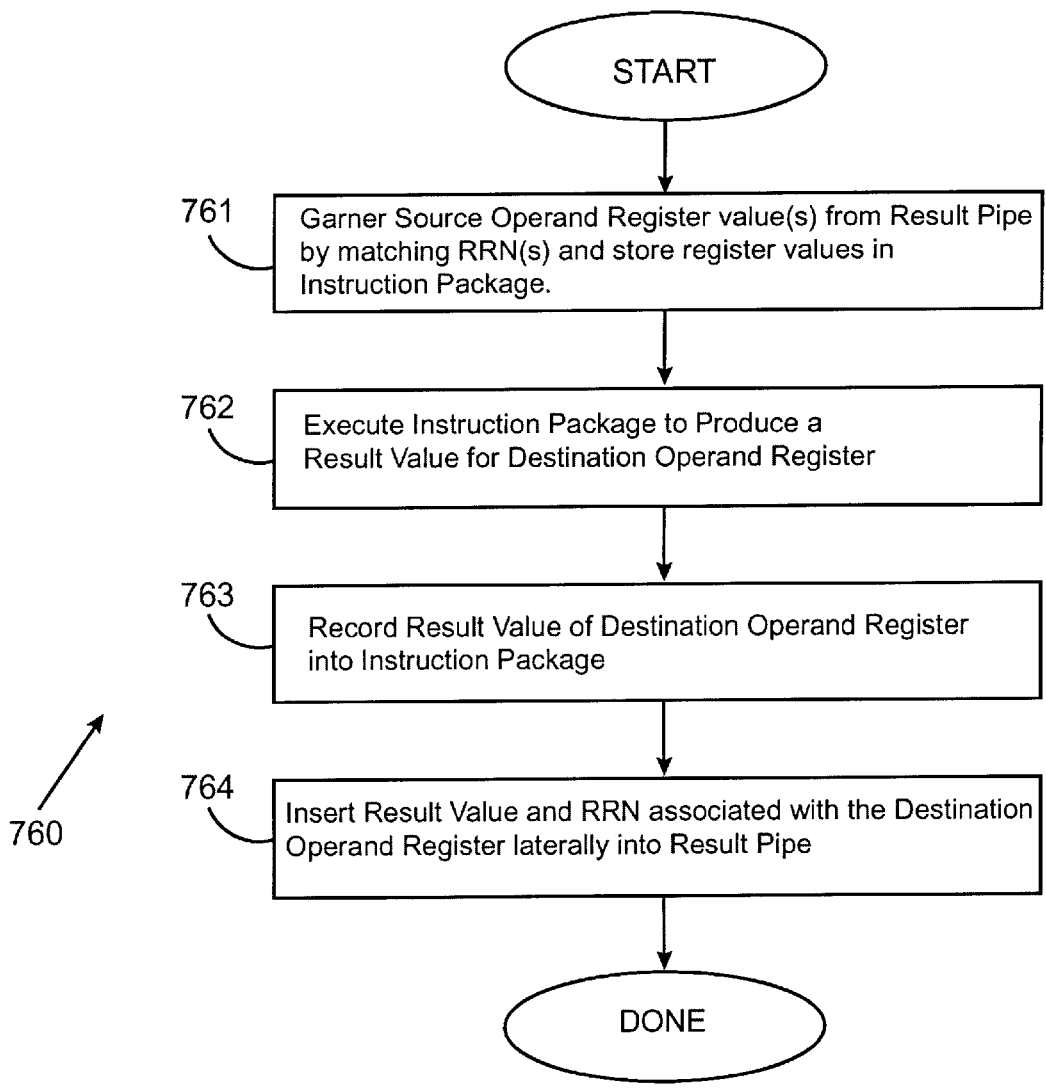
FIG. 7D is a flowchart illustrating the processing of instruction packages in the execution pipe of the counterflow pipeline.

FIG. 7A–7D are flowcharts illustrating the processing of instructions in counterflow pipeline 200 in accordance with this embodiment of the present invention. FIG. 7A is a high level flowchart illustrating the processing of instructions in counterflow pipeline 200. FIG. 7B is a detailed flowchart illustrating the assignments and use of RRNs for source operand registers of the instructions. FIG. 7C is a detailed flowchart illustrating the assignments and use of RNNs for destination operand registers of the instructions. FIG. 7D is a detailed flowchart illustrating the processing of instruction packages in execution pipe 220. Note that although the processing of source and destination registers of the instructions are described in sequential steps, concurrent handling of multiple operand registers is possible by trading circuit complexity for higher performance.

Conceptually, as illustrated by FIG. 7B, for each source operand register detected, renaming table 235 is scanned for an existing entry matching the source register (steps 731 and 732). If such an entry exists, the RRN associated with the source register is retrieved (step 733). Conversely, if no valid entry is found, a new RRN is assigned, the assignment recorded in renaming table 235, and a request for the register value of the source register is communicated to register file 210 (steps 734,735) In both cases, the RRN is written into the corresponding source register RRN field of the instruction package (step 736).

Referring now to FIG. 7C, in the case of a destination operand register, the renaming table is scanned for an existing entry matching the destination operand register (step 741). If such a valid entry is found, the existing entry is invalidated or written over (step 743). Next, a new RRN is assigned to the destination operand register and the assignment recorded in renaming table 235 (step 744). The RRN is also recorded into the corresponding destination register RRN field of the instruction package (step 745). Note that until an identical destination operand register is rewritten by another instruction, the same RRN will be used for younger instructions having this destination operand register as one of its source operand register.

The following is a detailed description of the operation of counterflow pipeline 200 using assembler instructions I1, I2 and I3 as specific examples. Initially, instruction I1 is fetched from instruction cache 260, and launched by instruction launch stage 250 into register exam stage 230 where it is decoded and examined for (non-unique) source and destination operand registers. (Steps 710 and 720 of FIG. 7A). CPUI 110 scans renaming table 235 for a valid entry associated with source operand register R1. (Step 731 of FIG. 7B). Since all the entries of renaming table 235 are invalid as shown in FIG. 6A, operand register R1 is assigned a new RRN "001" by RRN counter 236 (step 734). As shown in the table of FIG. 6B, the assignment of destination operand register R1 with RRN "001" is recorded in a first entry of renaming table 235 which is marked "valid". Subsequently, until operand register R1 is rewritten, younger instruction packages with register R1 as a source operand register will associate register R1 with RRN "001".

Two steps occur next. First, a request for the register value of register R1 is communicated to register file 210 (step 735). Second, the source operand RRN of R1 is also written into SR2RRN field 335a of a corresponding instruction I1 package (step 736). Many variations in transferring source register values from register file 210 into the instruction packages are possible. In this embodiment, the source register values are retrieved from register file 210 and inserted with their respective RRNs into result pipe 222 at result stage RS(N) in the form of result packages. In another embodiment, result pipe 222 is bypassed and source register values are transferred from register file 210 directly into the instruction packages.

As shown in FIG. 7C, a scan of renaming table 235 is conducted for destination operand register R2 (step 741). Since there is no valid entry matching destination register R2, register R2 is assigned a new RRN of "010", obtained by incrementing RRN counter 236. Alternatively, RRN counter 236 may be pre-incremented after each new RRN assignment. The assignment recorded in a second entry of renaming table 235 as shown in FIG. 6C (step 744). In addition, RRN "010" is recorded into DRRRN field 338a of instruction I1 package (step 745).

Note that prior to an assignment of a new RRN to a destination operand register, CPU 110 scans renaming table 235 for an existing "valid" entry matching the destination operand register (step 742). If a valid entry exist, the entry is marked "invalid" or written over with the new RRN assignment for the operand register (step 743). Invalidating or writing over such existing valid entries of renaming table 235 associated with the destination operand register ensures that stale register values associated with the destination operand register are not erroneously retrieved from result pipe 222 by younger instruction(s). Updating renaming table 235 is necessary since different result packages corresponding to an identical operand register may be inserted into result pipe 222 out-of-order different result stages. Such anomalies occur because although instruction packages enter execution pipe 220 in an original program order, these instruction packages are processed concurrently by different instruction stages of execution pipe 220. As a result, the execution of these instruction packages can complete in an order different from that of the original program order.

Instruction I1 package corresponding to instruction I1 enters instruction stage IS(1) of instruction pipe 221 and advances up instruction pipe 221 before reaching an available instruction stage capable of performing an "ADD" operation, e.g., instruction stage IS(f). (Steps 750 and 760 of FIG. 7A). Meanwhile, the register value and its associated RRN "001" are propagating down result pipe 222 towards result stage RS(f) which corresponds to instruction stage IS(f). This register value associated with RRN "001" is garnered via comparator/inserter CI(f) and stored in second source value field 336 (Step 761 of FIG. 7D). Instruction I1 package is executed, i.e., the integer value 2, which is stored in first source value field 333, is added to the garnered register value, which is stored in second source value field 336 (step 762). The resulting sum, i.e., the register value for destination register R2, is recorded in result value field 339 of the instruction I1 package (step 763). This register value is also inserted laterally by comparator/inserter CI(f) into result stage RS(f) together with RRN "002" (step 764). Subsequently, the register value of register R2 can be identified and garnered by younger instruction packages which have register R2 as one of its source operands as the younger instruction packages advance up instruction pipe 221.

When instruction I2 reaches register exam stage 230, register R2 is identified as one of the source operands of instruction I2 (step 720). A scan of renaming table 235 in search of a valid entry matching register R2 is initiated (step 731). Assuming the sequence of assembler instructions I1 through I3 maintains a conventional (sequential) program order, only one valid entry matching register R2 should and does exist in renaming table 235. As shown in FIG. 6C, the second entry of renaming table 255 contains an association of operand register R2 with RRN "010". RRN "010" is retrieved from renaming table 235 and recorded in the SR1RRN field 332a of a corresponding instruction I2 package (steps 733 and 736). Later, instruction I2 package will be able to garner the source operand register value associated with RRN "010" as the corresponding result package counterflows down result pipe 222.

Prior to assigning a new RRN for destination operand register R2, CPU 110 scans renaming table 235 for any "valid" entry(s) matching register R2 (step 741). As shown in FIG. 6C, one valid entry matching register R2 already exists. RRN counter 236 is incremented by one to produce a new RRN of "011", and a new association of register R2 with RRN "011" recorded over the same (second) entry of renaming table 235, and the entry marked valid as shown in FIG. 6D (steps 743 and 744). In addition, RRN "011" is recorded in the DRRRN field 338a of instruction I2 package (step 745).

Instruction I2 package then enters instruction stage IS(1) (behind instruction I1) and advances up instruction pipe 221 before reaching an available instruction stage capable of performing the arithmetic operation subtract (SUB), e.g., instruction stage IS(g) (step 750). When all the source register operand values of instruction I2 (only register R2 in instruction I2) have been garnered, and stored in the appropriate value fields 333,336, instruction I2 package is executed (step 761). The integer value "5" is subtracted from the garnered register value of source operand register R2 and a new register value computed for destination operand register R2 (step 762). This new register value is recorded in result value field 339 of instruction I2 package (step 763). In addition, the register value for register R2, together with new RRN "011" are inserted laterally to result stage RS(g) by corresponding comparator/inserter CI(g) (step 764).

When instruction I3 enters register exam stage 230, registers R2 and R3 are identified as the source operands (step 720). CPU 110 initiates a retrieval of the RRN associated with source operand register R2, beginning with a scan of renaming table 235 for a valid entry matching register R2 (step 731). As shown in FIG. 6D, RRN "011" associated with matched register R2 is retrieved from renaming table 235 and recorded into the SR1RRN field 332a of a corresponding instruction I3 package (steps 733, 736).

The scanning of renaming table 235 and the RRN retrieval process are attempted for source operand register R3 (step 731), with no valid entry matching register R3 found, as shown in FIG. 6D. As shown in FIG. 6E, a new RRN "100" is assigned to register R3 and recorded in renaming table 235 (step 734). A request for the register value of operand register R3 is communicated to register file 210 (step 735). The request results in an insertion of a result package having RRN "100" and associated register value. RRN "100" is also recorded in SR2RRN field 335a of instruction I3 package (step 736).

Figure 6F:
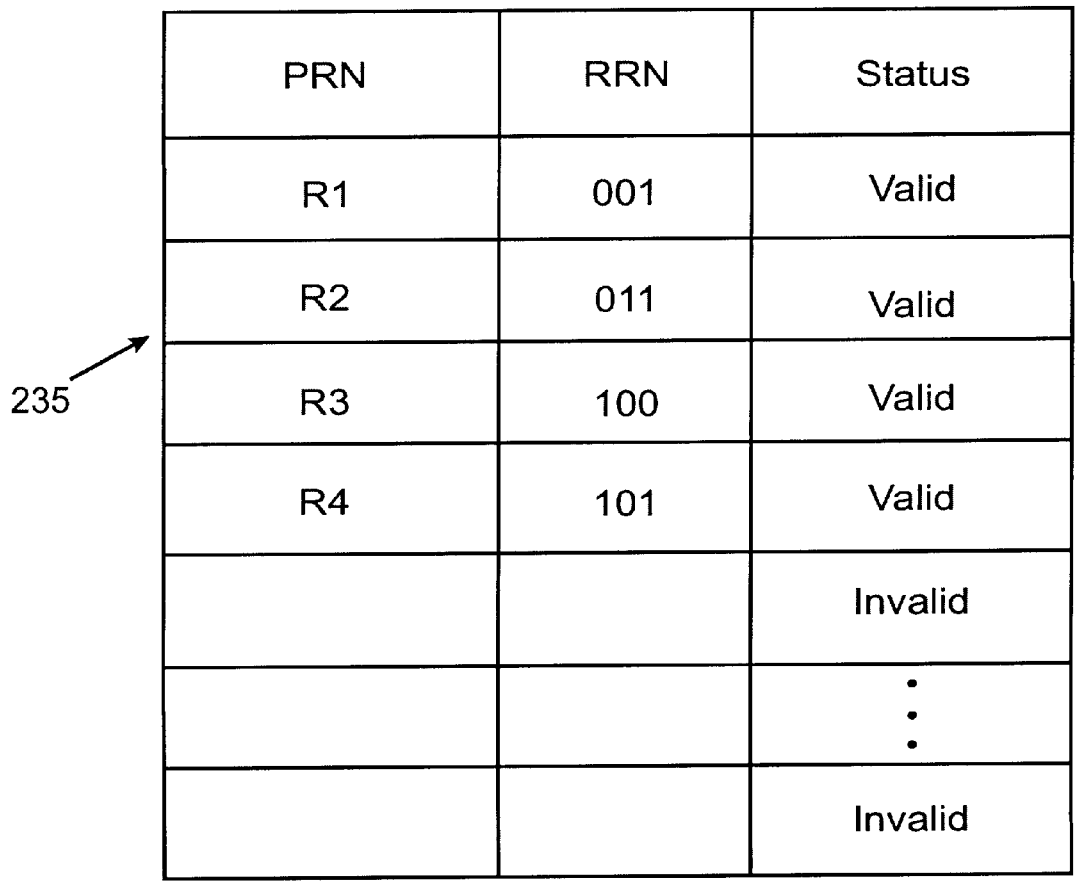

Next, CPU 110 scans renaming table 535 for any entry matching destination operand register R4 of instruction I3 package (741). As shown in FIG. 6E, no valid entry matching register R4 exists. CPU 110 increments RRN counter 236 by one to generate a new RRN of "101". Using the fourth entry of renaming table 250, an assignment of register R4 with RRN "101" is recorded, as shown in FIG. 6F (step 744). In addition, RRN "101" is written into DRRRN field 338a of instruction I3 package (step 745).

The resulting instruction I3 package is inserted into execution pipe 220 at instruction stage IS(1) (step 750). Instruction I3 package then advances execution pipe 220 before reaching an available instruction stage capable of performing a multiply (MUL), e.g., instruction stage IS(h). Eventually, the result packages which includes RRN "011" and "100", respectively, counterflow down result pipe 222 to result stage RS(h). These two result packages are garnered (step 761) and the respective register values stored in source value fields 333, 336. When both source operand register values of instruction I3 package have been garnered from result pipe 220, instruction I3 package is executed. The respective retrieved register values stored in source value fields 333,336 are multiplied together to produce a register value for destination operand result R4 (step 762).

The register result value is now recorded into result value field 339 of instruction I3 package (step 763). This register value and RRN "101", associated with destination operand register R4, are also inserted into result stage RS(h) of result pipe 522 via comparator/inserter CI(h) (step 764). Eventually, instruction I3 package propagates up instruction pipe 521 and exits at instruction stage IS(N).

Note that whenever an instruction package exits instruction stage IS(N), the non-unique register identifier, e.g., the physical register number, and the corresponding register value, stored in fields 338, 339, respectively, of the instruction package are used to update the corresponding register value(s) of register file 210. For example, in the case of instruction I3 package, non-unique register identifier R4 of instruction I3 package, and its associated register result value are used to update the register value of register R4 in register file 210.

In accordance with another aspect of the present invention, whenever an instruction which causes a trap condition, e.g., a result overflow, it is not necessary to kill all result packages associated with the same non-unique register identifier. This is because although multiple register values in result pipe 222 may have originated from an identical non-unique register identifier, each corresponding result package in result pipe 222 includes a unique and hence distinguishable RRN.

The above description of counterflow pipeline 200 and renaming table 235 is merely illustrative of the present invention. For example, renaming table 235 may be implemented using dedicated hardware, such as associative memory, a software table in system memory 108 or a combination of both. Other variations are also possible. For example, unique RRN fields 332a, 335a, 338a may replace non-unique register identifier fields 332, 335, 338, respectively, upon entering execution pipe 220. Subsequently, non-unique fields 332, 335, 338 are restored upon exiting execution pipe 220 and used to update register file 210. Hence, many modifications and/or additions by one skilled in the art are possible without deviating from the spirit of the present invention.

What is claimed is:

1. A counter flow pipeline processor, comprising:
    an instruction pipe for executing a first instruction to produce a register value associated with a register;
    a renaming table coupled to said instruction pipe for recording an assignment of a unique register identifier to said register, wherein said register value and said unique resister identifier form a result package;
    a result pipe for retaining said result package wherein said instruction pipe and said result pipe are coupled so as to counterflow with respect to each other; and
    a comparator/inserter coupled between said instruction pipe and said result pipe for inserting said result package into said result pipe and for garnering said register value from said result pipe into said instruction pipe for a younger instruction.

2. The pipeline processor of claim 1 further comprising a counter for producing said unique register identifier.

3. The pipeline processor of claim 1 wherein said unique register identifier is a renamed register number (RRN).

4. The pipeline processor of claim 2 wherein said counter is a modulo counter.

5. A method of labeling resister values of instructions useful in a counterflow pipeline processor having an instruction pipe and a result pipe, the method comprising the steps of:
    assigning a unique register identifier to a destination operand register of a first instruction in the processor;
    associating said unique register identifier with a destination register value produced by an execution of the first instruction in the instruction pipe;
    inserting said unique register identifier and said associated destination register value in to the result pipe:
    associating a source operand register of a younger instruction with said unique register identifier, wherein said source operand register of the younger instruction is identical to said destination operand register of the first instruction; and
    garnering said destination register value associated with said unique register identifier from the result pipe for a source register value corresponding to said source operand register of the younger instruction.

6. The method of claim 5 wherein said unique register identifier is a renamed register number (RRN) and said method further comprising the step of recording an assignment of said RRN to said destination operand register in a renaming table.

7. The method of claim 6 further including a step of scanning said renaming table for an existing entry matching said destination operand register and invalidating any such existing entry prior to the recording step.

8. The method of claim 6 wherein said step of associating said source operand register of the younger instruction includes a step of retrieving said RRN by scanning said renaming table for an entry matching said source operand register of the younger instruction.

9. The method of claim 5 further comprising a step of updating a register file with said destination register value.

10. A method of labeling register values of instructions useful in a counterflow pipeline processor having an instruction pipe and a result pipe, the method comprising the step of:
    assigning a unique register identifier to a source operand register of a first instruction in the processor wherein said unique register identifier is a renamed register number (RRN); scanning a renaming table for an entry matching said source operand register of the first instruction; and recording an assignment of said RRN to said source operand register in the renaming table.

11. The method of claim 10 further comprising the step of communicating to a register file a request for a register value corresponding to said source operand register.

12. The method of claim 11 further comprising the step of inserting said register value and said RRN into the result pipe.

13. The method of claim 12 further comprising a step of garnering said register value associated with said RRN from the result pipe into the instruction pipe.

* * * * *